H. D. WOLCOTT.
END THRUST BEARING ATTACHMENT FOR THE TRANSMISSION SHAFTS OF FORD AUTOMOBILES.
APPLICATION FILED JAN. 17, 1918.
1,272,165.
Patented July 9, 1918.
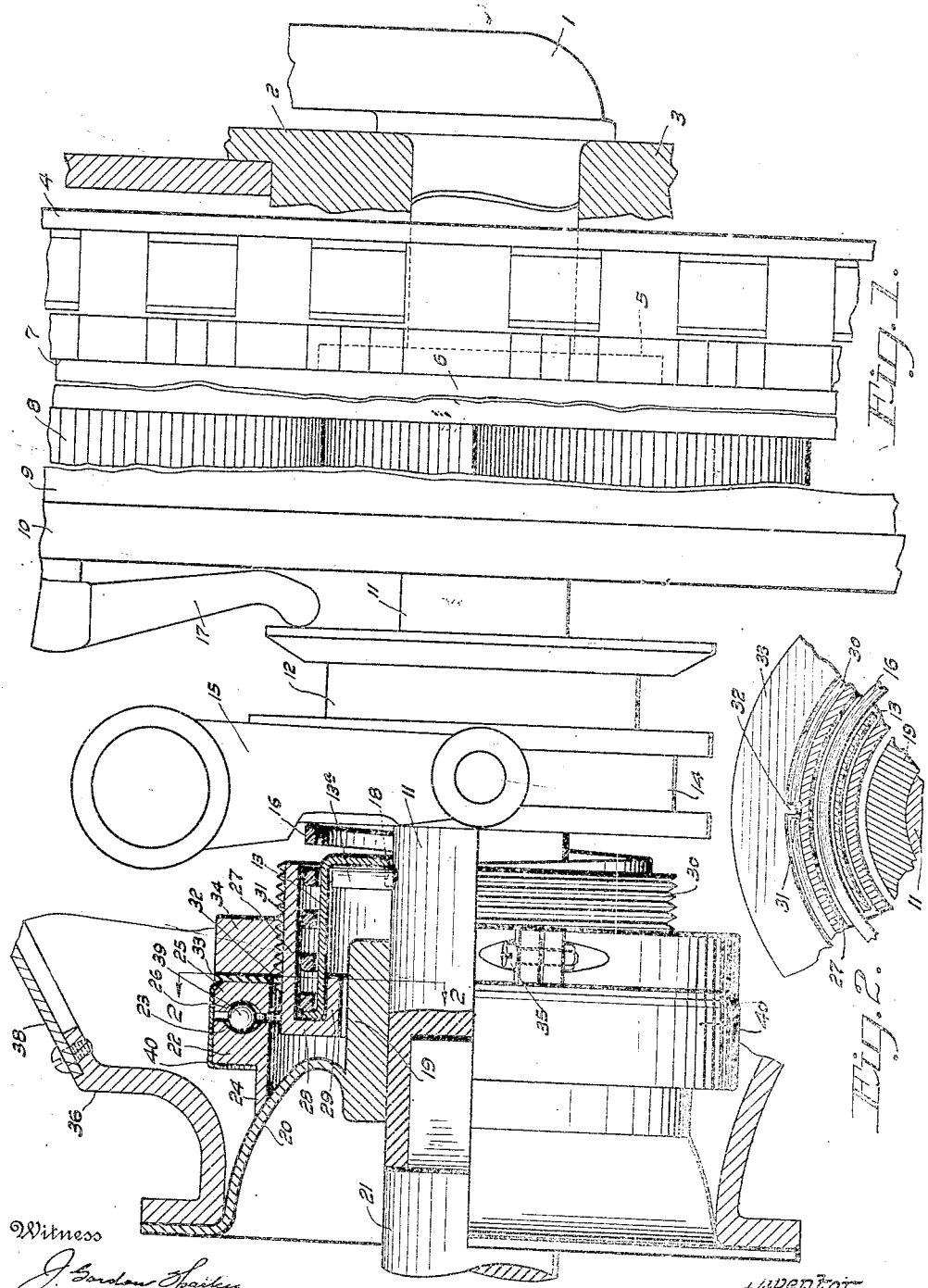
Witness
J. Gordon Parker
Inventor
H. D. Wolcott
By
Attorney

UNITED STATES PATENT OFFICE.

HARVEY D. WOLCOTT, OF BIRMINGHAM, ALABAMA.

END-THRUST-BEARING ATTACHMENT FOR THE TRANSMISSION-SHAFTS OF FORD AUTOMOBILES.

1,272,165.

Specification of Letters Patent.

Patented July 9, 1918.

Application filed January 17, 1918. Serial No. 212,177.

*To all whom it may concern:*

Be it known that I, HARVEY D. WOLCOTT, a citizen of the United States of America, residing at Birmingham, in the county of Jefferson and State of Alabama, have invented certain new and useful Improvements in End-Thrust-Bearing Attachments for the Transmission-Shafts of Ford Automobiles, of which the follwing is a specification.

This invention relates to an end thrust bearing adapted to be applied as an attachment to automobiles having a planetary gear transmission such as Ford automobiles to take up the wear on the bearings of the crank shaft and to eliminate relative displacement between parts of the transmission and magneto.

In Ford automobiles as now constructed there is a substantial rearward end thrust resulting from the compression of the clutch spring on the crank shaft and the moving parts of the magneto and transmission which results in the wearing away of the shaft bearings so as to permit the shaft to have appreciable endwise play rearwardly. When this occurs the transmission shaft, the driving plate and its quill, and the parts supported thereby in the magneto, transmission and clutch become displaced. The results of this wear are serious as it magnifies the air gap between the poles of the magneto to such an extent as to materially reduce its efficiency; it prevents the proper driving contact between the transmission gear teeth; and it interposes a lost-motion between the pedals controlling the clutch and the gear shaft and the gears and clutch which interferes with the proper control of these parts. At present the only way to overcome these difficulties is to take down the engine and insert a new lower half bearing on the rear main bearing of the crank shaft next to the transmission case. This repair involves substantial expense for labor and material, and it is to be noted that only the lower half of the bearing is replaceable, the upper half being integral with the cylinder block.

The purpose of my invention is to provide as an attachment which can be readily applied to cars with but little expense, a thrust bearing which can be relied upon to take up this end thrust as soon as it becomes appreciable and to compensate it as it increases to the end that the disadvantages hereinabove outlined may be entirely avoided in the normal operation of the automobile.

It is a further object of my invention to so design the thrust bearing that it can be readily inserted without change or modification of any of the standard parts to which it is applied, my preferred method of attachment being to detach the drive shaft from the transmission shaft, remove the transmission cover, slip off the front universal ball cap, and insert the thrust bearing attachment so as to mount one member on the clutch spring support and the other member on the front universal ball cap when remounted.

My invention further comprises the novel details of construction and arrangements of parts as shown in their preferred embodiment only in the accompanying drawings, in which:—

Figure 1 presents in quarter section my thrust bearing attachment and the immediate parts to which it is applied, the other elements of the clutch, the transmission gears and the magneto being formally and partially illustrated in elevation so that the operation of the invention may be better understood.

Fig. 2 is a partial vertical sectional view on the line 2—2 of Fig. 1.

Similar reference numerals refer to similar parts throughout the drawings.

As illustrated in the drawings, the rear end of the crank shaft 1 of a Ford car is shown mounted in the crank shaft rear bearing comprising an upper half integral with the motor block 2 and a lower half 3 bolted to the motor block. A magneto coil support 4 is bolted to the motor block and the crank shaft has a plate 5 at its rear end which is bolted to the fly wheel 6, which in turn carries the magnet support 7, and to the transmission shaft which is not shown but which, in the manner well understood, carries the transmission gearing 8 and the clutch elements 9. The driving plate 10 of the clutch has a hollow shaft 11 fast thereon and adapted to support the clutch shift 12 and the clutch spring support 13. The clutch release ring 14 is engaged by a fork 15 operated in the manner well understood by the clutch pedal (not shown) and serves to shift the parts rearwardly against the tension of the clutch spring 16. The clutch shift operates the clutch push finger 17 in the manner well understood to control the clutch disks (not shown). The clutch spring support 13 is formed of stamped metal having its forward end lying in a vertical plane and inturned at 18 to fit on the shaft 11 while the main body portion of the support lies in a circumferential plane above the shaft 11 and spaced therefrom sufficiently to leave a clearance between it and a bearing sleeve 19 at the forward end of the front cap 20 of the universal ball joint not shown. A pin 13ª holds the spring support on the shaft 11. A driving shaft 21 makes the customary joint with the socketed rear end of the shaft 11. The parts as thus far described are all characteristic of the present Ford automobiles and being well understood by those skilled in this art a further detail description of them is unnecessary and is therefore omitted.

The thrust, due to the compression of the clutch spring, transmits to the crank shaft an end thrust rearward of the car which causes in a short time an appreciable wear in the crank shaft bearings which results in the crank shaft and all parts movable therewith being free to shift bodily rearward relatively to the motor block and the transmission case. This increases the air gap between the poles of the magneto and introduces a lost-motion play in the control of the clutch and in the shifting of the gears which it is the purpose of my invention to obviate.

My invention comprises a bearing attachment embodying an annular member 22 carrying in its front vertical face a race 23 and having at its rear an annular flange 24 extending to and beveled to seat against the tapered face of the front universal ball cap 20 which will serve to center and hold this element of the bearing in proper position. A second annular member 25 has in its rear vertical face a race 26 complementary to 23 and surrounds the sleeve 27 which in turn surrounds and is spaced from the spring 16 and its support 13. The rear end 28 of the sleeve is turned inwardly toward the shaft 11 and carries a sleeve 29 which fits snugly into the rear open end of the support 13 and is centered thereby. The portion 29 of the sleeve is spaced from the sleeve 19 of the ball cap 20. The forward portion of the sleeve 27 is provided externally with threads 30 and has a longitudinal groove 31 cut through the threaded portion of this sleeve and adapted to receive a tongue 32 on a washer 33 which is forced against the bearing member 25 by a nut 34 which is screwed on the threads 30. The nut 34 is a split nut having its sections adjustably connected by a screw 35 which serves in the manner well understood to clamp it in secure engagement with the threads 30. The tongue 32 prevents the washer turning and this prevents any tendency of the bearing member 25 to unscrew the nut.

In applying the attachment, the transmission cover 36 is removed, the driving shaft 21 is disconnected from the shaft 11 and the universal ball cap slipped off the latter shaft. The sleeve 27 with the antifriction bearing assembled thereon is slipped in place on the spring support 13 and the shaft 21, cap 20 and transmission cover replaced to normal operating position. The sloping door 38 of the transmission cover being removed, access is given to the nut 34 which is then screwed rearwardly until the flange 24 takes its bearing against the cap 20, in which position the antifriction balls 39 working in the race ways 23 and 26, will take all end thrust wear on the bearings of the crank shaft and the transmission driving connections between it and the driving shaft 21 and as the wear continues the nut 34 may be advanced on the threads so as to prevent any endwise movement of the crank shaft and transmission elements.

The bearing elements 22 and 25 are held together by an annular sleeve 40 or equivalent element and the bearing proper is floating and self centering on the tapering cap 20. By this arrangement I avoid any delicacy in applying the bearing. I prefer to use an antifriction bearing but other types of thrust bearings may be employed.

Having thus described my invention, what I claim as new and desire to secure by Letters Patent, is:—

1. In a thrust bearing for the shafting of automobiles having a planetary gear transmission, the combination with a clutch spring support and the front universal ball cap, of an end thrust bearing attachment having co-acting elements mounted respectively on said cap and spring support, substantially as described.

2. In a thrust bearing for the shafting of automobiles having a planetary gear transmission, the combination with a clutch spring support and the front universal ball cap, of an end thrust bearing attachment having a co-acting element mounted respectively on said cap and spring support, and means to relatively adjust said bearing elements to compensate for increased wear.

3. In an end thrust bearing attachment for the shafting of automobiles having a planetary gear transmission, the combination with the clutch spring support and the transmission cover, of a bearing element mounted on the spring support free of contact with the clutch spring, a co-acting element, and a support for said latter element rigid with the transmission cover.

4. In combination, a motor crank shaft, transmission and clutch elements, a clutch spring co-acting with the clutch elements, a clutch spring support mounted fast on a transmission element and spaced therefrom, a sleeve mounted on said clutch support and forming a housing over the clutch spring, a bearing element on said sleeve, a co-acting bearing element, a transmission cover, and means to mount the latter element on said cover, substantially as described.

5. The combination of a clutch spring, a clutch spring support, a transmission element of a planetary transmission to which said support is keyed, a driving shaft, a tapering front universal ball cap, an annular bearing element having a taper face disposed to bear on said tapering cap to center it, an annular sleeve having a flanged portion fitted into the rear open end of the spring support, and a bearing element adjustably mounted on said sleeve and co-acting with said element on said cap, substantially as described.

6. An attachment for automobiles having a planetary gear transmission, comprising an annular externally threaded sleeve having at its rear end an internal supporting member adapted to fit into the clutch spring support, an antifriction bearing comprising an element mounted on said sleeve, and means to adjust said element on said sleeve, the other bearing element having a tapered bearing end adapted to seat against the adjacent tapered face of the front universal ball cap.

7. An attachment for automobiles having a planetary gear transmission comprising in combination a cylinder block, a transmission mechanism comprising an element carrying one pole of the magneto, another pole of the magneto fast to said cylinder block, an annular clutch spring support fast on a transmission element and having a portion thereof substantially spaced from said latter element, a clutch spring mounted on said support, a transmission cover, a tapered front universal ball cap fast to said transmission cover, and an end thrust bearing attachment interposed between said cap and spring support, said attachment comprising a floating self-centering antifriction ring bearing comprising one member engaging the tapered face of said ball cap, a bearing support mounted on the spring support and engaged by said other bearing member, and means to adjust said bearing support to preserve the predetermined air gap between the magneto poles.

In testimony whereof I affix my signature.

HARVEY D. WOLCOTT.

Witness:
NOMIE WELSH.